United States Patent
Yamamoto

(10) Patent No.: US 7,414,675 B2
(45) Date of Patent: Aug. 19, 2008

(54) TELEVISION TUNER BEING CAPABLE OF RECEIVING FM BROADCAST SIGNAL

(75) Inventor: Masaki Yamamoto, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 835 days.

(21) Appl. No.: 10/924,108

(22) Filed: Aug. 23, 2004

(65) Prior Publication Data

US 2005/0062894 A1    Mar. 24, 2005

(30) Foreign Application Priority Data

Aug. 25, 2003   (JP) ............................. 2003-270730

(51) Int. Cl.
  *H04N 5/46*    (2006.01)
  *H04N 4/50*    (2006.01)
(52) U.S. Cl. ...................... 348/729; 348/731
(58) Field of Classification Search ......... 348/731–733, 348/725, 729; 455/178.1, 182.1–182.3, 176.1, 455/188.1, 168.1, 169.2, 180.4, 193.3, 314, 455/191.1–192.3; *H04N 5/44, 5/46, 5/50*
See application file for complete search history.

(56) References Cited

U.S. PATENT DOCUMENTS 6,721,017 B2 * 4/2004 Yamamoto .................. 348/729
7,030,937 B2 * 4/2006 Yamamoto .................. 348/729
7,123,309 B2 * 10/2006 Yoda .......................... 348/731

FOREIGN PATENT DOCUMENTS

JP   A1 2001-157128   6/2001
JP   A2 2001-238143   8/2001

* cited by examiner

*Primary Examiner*—Sherrie Hsia
(74) *Attorney, Agent, or Firm*—Brinks Hofer Gilson & Lione

(57) ABSTRACT

A television tuner contains a mixer 1 to which a television signal or an FM broadcast signal is input and outputs an intermediate frequency signal based on the television signal or an intermediate frequency signal based on the FM broadcast signal, an intermediate frequency tuning circuit 2 for tuning to the intermediate frequency signals, and an intermediate frequency amplifier 3 for amplifying the intermediate frequency signal output form the intermediate frequency tuning circuit. The intermediate frequency tuning circuit 2 and the intermediate frequency amplifier 3 are connected to each other via switch diodes 4 and 5, the switch diodes are turned ON upon receiving the television signal and turned OFF upon receiving the FM broadcast signal.

4 Claims, 3 Drawing Sheets

US 7,414,675 B2

TELEVISION TUNER BEING CAPABLE OF RECEIVING FM BROADCAST SIGNAL

This application claims the benefit of priority to Japanese Patent Application No. 2003-270730, herein incorporated by reference.

BACKGROUND OF THE INVENTION

1. Field of the Invention

The present invention relates to a television tuner configured to be capable of receiving an FM broadcast signal, in addition to a television signal.

2. Description of the Related Art

FIG. 5 illustrates the construction of the primary portions of a conventional television tuner capable of receiving a television signal and an FM broadcast signal. Either the received television signal or FM broadcast signal is selected and input to a mixer 11, and mixed with a local oscillating signal (not shown) supplied to the mixer 11 to be converted into an intermediate frequency signal in the television intermediate frequency band. The intermediate frequency signal is input to an intermediate frequency amplifier 13 via an intermediate frequency tuning circuit 12.

Here, the intermediate frequency tuning circuit 12 includes a capacitive element 12a, two serially connected inductance elements 12b and 12c, which are connected in parallel to the capacitive element 12a, and a varactor diode 12e connected in parallel to the capacitive element 12a and the inductance elements 12b and 12c via a DC-cut capacitive element 12d. Also, the power supply voltage Vcc supplied to the connection point of the two inductance elements 12b and 12c, is supplied to the mixer 11. The intermediate frequency tuning circuit 12 and the intermediate frequency amplifier 13 are connected to each other by the DC-cut capacitive elements 14 and 15.

The cathode of the varactor diode 12e is supplied with the power supply voltage and the anode thereof is connected to a switch circuit 16. The switch circuit 16 is switched via a resistor such that the anode of the varactor diode 12e is either grounded or connected to the power supply to be supplied with a voltage Ve lower than the power supply voltage.

In the above-mentioned construction, upon receiving the television signal, the television signal of the selected channel is input to the mixer 11. Also, the anode of the varactor diode 12e is grounded via the resistor by the switch circuit 16. Therefore, the voltage between the both ends of the varactor diode 12e becomes the power supply voltage Vcc. By the capacitance value of the varactor diode 12e, the tuning frequency of the intermediate frequency circuit 12 is set to be positioned between a video intermediate frequency P (58.75 MHz) and an audio intermediate frequency S (54.25 MHz), as illustrated in FIG. 6.

Further, upon receiving the FM broadcast signal, the FM broadcast signal of the selected frequency is input to the mixer 11. Moreover, the anode of the varactor diode 12e is supplied with the voltage Ve by the switch circuit 16. Therefore, since the voltage between the both ends of the varactor diode 12e decreases to voltage Vcc−Ve, the capacitance value of the varactor diode 12e increases. By the capacitance value of the varactor diode 12e, the tuning frequency of the intermediate frequency circuit 12 is set to be positioned at an audio intermediate frequency S (54.25 MHz), as illustrated in FIG. 7 (For example, refer to Japanese unexamined Patent Publication No. 2001-157128 (FIG. 1, pages 3 to 4)).

Since the FM broadcast signal has a narrow frequency interval (200 kHz) with an adjacent broadcast signal, the selectivity of the intermediate frequency tuning circuit must be sharp in order to avoid interference therebetween. However, since the intermediate frequency amplifier is tightly connected to the intermediate frequency tuning circuit by the DC-cut capacitive element, and the input impedance of the intermediate frequency amplifier is low, there is the problem in that the intermediate circuit is Q-damped and thus the selectivity cannot be sufficiently sharp.

SUMMARY OF THE INVENTION

An object of the present invention is to provide a television tuner in which the Q value of the intermediate frequency tuning circuit can be increased when receiving the FM broadcast signal, without being affected by the intermediate frequency amplifier.

In order to solve the above-mentioned problems, a television tuner comprises a mixer to which a television signal or an FM broadcast signal is input and outputs an intermediate frequency signal based on the television signal or an intermediate frequency signal based on the FM broadcast signal, an intermediate frequency tuning circuit for tuning to the intermediate frequency signals, and an intermediate frequency amplifier for amplifying the intermediate frequency signal output from the intermediate frequency tuning circuit. The intermediate frequency tuning circuit and the intermediate frequency amplifier are connected to each other by a switch diode. The switch diode is turned ON upon receiving the television signal and turned OFF upon receiving the FM broadcast signal.

Moreover, a switch controlling circuit for turning the switch diode ON/OFF is provided, and the intermediate frequency amplifier and the switch controlling circuit are included in an integrated circuit.

In addition, the switch diode is included in the integrated circuit, the anode of the switch diode and the intermediate frequency amplifier are supplied with a common bias voltage, and the cathode of the switch diode is connected to the switch controlling circuit.

Further, the switch diode is provided at the outside of the integrated circuit, the mixer and the anode of the switch diode are supplied with a common bias voltage, and the cathode of the switch diode is connected to the switch controlling circuit.

Also, the intermediate frequency tuning circuit has an inductance element constituting a parallel tuning circuit and a varactor diode connected in parallel to the inductance element. The cathode of the varactor diode is supplied with the common bias voltage, and the cathode of the switch diode and the anode of the varactor diode are connected to the switch controlling circuit.

In the present invention, a television tuner comprises a mixer to which a television signal or an FM broadcast signal is input and outputting an intermediate frequency signal based on the television signal or an intermediate frequency signal based on the FM broadcast signal, an intermediate frequency tuning circuit for tuning to the intermediate frequency signals, and an intermediate frequency amplifier for amplifying the intermediate frequency signal output form the intermediate frequency tuning circuit. The intermediate frequency tuning circuit and the intermediate frequency amplifier are connected to each other by a switch diode, and the switch diode is turned ON upon receiving the television signal and turned OFF upon receiving the FM broadcast signal. Thereby, the intermediate frequency amplifier is loosely connected to the intermediate frequency tuning circuit when receiving the FM broadcast signal. Therefore, the load effect of the intermediate frequency amplifier for the intermediate frequency tuning circuit decreases, and thus the Q value of the tuning increases and the tuning characteristics become steep. Thereby, the interference from the adjacent broadcast signal can be reduced.

Moreover, a switch controlling circuit for turning the switch diode ON/OFF is provided and the intermediate frequency amplifier and the switch controlling circuit are included in an integrated circuit, such that the construction of the switch becomes simple.

In addition, the switch diode is included in the integrated circuit, the anode of the switch diode and the intermediate frequency amplifier are supplied with a common bias voltage, and the cathode of the switch diode is connected to the switch controlling circuit, such that the switch diode needs not have a dedicated bias circuit and simplifying the construction thereof.

Further, the switch diode is provided at the outside of the integrated circuit, the mixer and the anode of the switch diode are supplied with a common bias voltage, and the cathode of the switch diode is connected to the switch controlling circuit, such that sufficient current can flow when the switch diode is turned ON. Therefore, the distortion generated by the switch diode can be reduced.

Also, the intermediate frequency tuning circuit has an inductance element constituting a parallel tuning circuit and a varactor diode connected in parallel to the inductance element, the cathode of the varactor diode is supplied with the common bias voltage, and the cathode of the switch diode and the anode of the varactor diode are connected to the switch controlling circuit, such that the switch diode is turned OFF when receiving the FM broadcast signal and thus the capacitance value of the varactor diode can be increased. Accordingly, the intermediate tuning frequency upon receiving the FM broadcast signal can be matched with the audio intermediate frequency of the television signal.

DESCRIPTION OF THE PREFERRED EMBODIMENT

Hereinafter, embodiments of the present invention will now be described with reference to the drawings.

Figure 1:
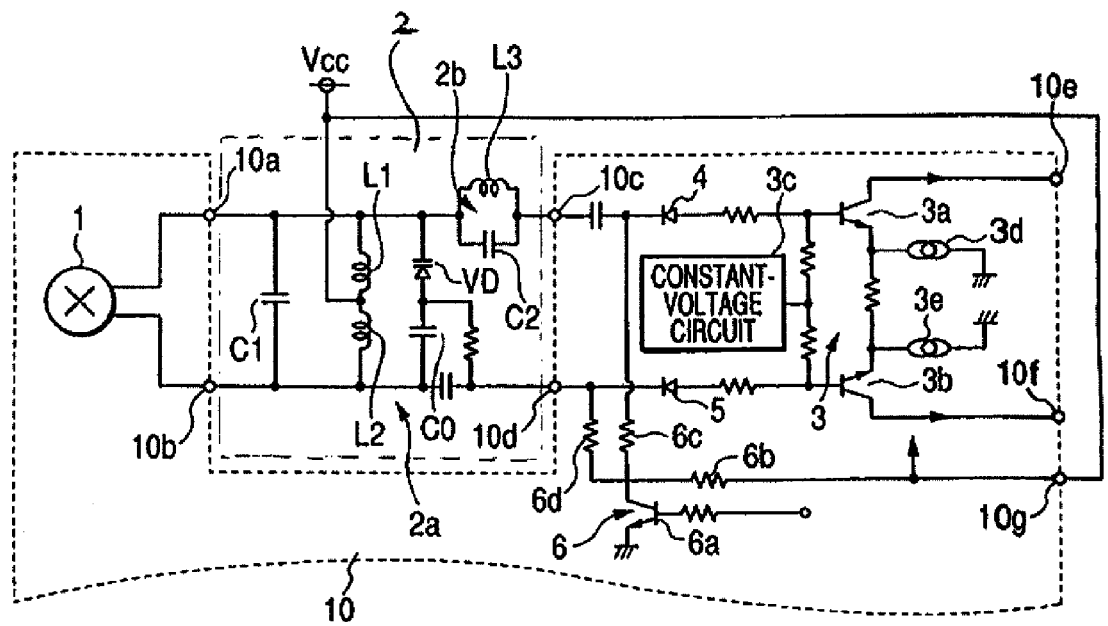
FIG. 1 is a circuit diagram illustrating the construction of a television tuner according to the present invention.

FIG. 1 illustrates the construction of the primary portions of a television tuner of the present invention. Either the received television signal or FM broadcast signal is selected and input to a mixer 1, and mixed with a local oscillating signal (not shown) supplied to the mixer 1 to be converted into an intermediate frequency signal in the television intermediate frequency band. The intermediate frequency signal is input to an intermediate frequency amplifier 3 via an intermediate frequency tuning circuit 2.

Here, the mixer 1, the intermediate frequency tuning circuit 2 and the intermediate frequency amplifier 3 are composed of a balanced circuit, the mixer 1 and the intermediate frequency amplifier 3 is included in an integrated circuit 10, and the intermediate frequency tuning circuit 2 is provided at the outside of the integrated circuit 10. In the integrated circuit 10, parallel output terminals 10a and 10b connected to the output port of the mixer 1, and parallel input terminals 10c and 10d connected to the input port of the intermediate frequency amplifier 3 are provided, and the intermediate frequency tuning circuit 2 is connected between the parallel output terminals 10a and 10b and the parallel input terminals 10c and 10d.

The intermediate frequency tuning circuit 2 includes a capacitive element C1, two serially connected inductance elements L1 and L2, which are connected in parallel to the capacitive element C1, a parallel tuning circuit 2a comprised of a varactor diode VD, which is connected in parallel to the capacitive element C1 and the inductance elements L1 and L2 via a DC-cut capacitive element C0, and a trap circuit 2b composed of a parallel circuit including an inductance element L3 and a capacitive element C2 for resonating at a video carrier wave of an adjacent channel. Also, the power supply voltage Vcc applied to the connection point of the two inductance elements L1 and L2, is supplied to the mixer 1.

The intermediate frequency amplifier 3 has two transistors 3a and 3b. The bases of the two transistors 3a and 3b, which are input ports are applied with a bias voltage from a constant-voltage circuit 3c and the resistively connected emitters thereof are connected to constant-current sources 3d and 3e, respectively. In addition, each collector thereof is connected to parallel output terminals 10e and 10f. Also, each collector thereof is supplied with the power supply voltage Vcc from a power supply terminal 10g.

The bases of the transistors 3a and 3b are connected to the parallel input terminals 10c and 10d via switch diodes 4 and 5, respectively. At this time, the anodes of the switch diodes 4 and 5 are connected to the bases of the transistors 3a and 3b, such that the bias voltage is also applied to the anodes of the switch diodes 4 and 5. In addition, the switch diodes 4 and 5 are turned ON/OFF by a switch controlling circuit 6.

The switch controlling circuit 6 is included in an integrated circuit 10 and has a switch transistor 6a. The collector of the switch transistor 6a is pulled up to the power supply voltage by a feeding resistor 6b and is connected to the cathode of the switch diode 4 via a high-frequency blocking resistor 6c. Also, the anode of the varactor diode VD in the intermediate frequency tuning circuit 2 is connected to the cathode of the switch diode 5 via the parallel input terminal 10d, and is connected to the collector of the switch transistor 6a via a high-frequency blocking resistor 6d, together with the cathode of the switch diode 5. The base of switch transistor 6d is supplied with the switch voltage.

Figure 2:
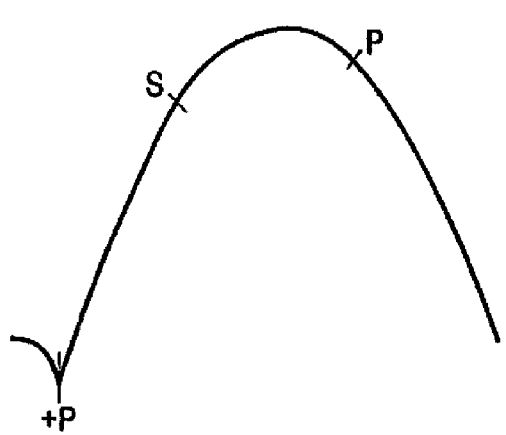
FIG. 2 is an intermediate frequency characteristic diagram when receiving a television signal in the television tuner according to the present invention.

In the above-mentioned construction, upon receiving the television signal, the television signal of the selected channel is input to the mixer 1. Simultaneously, the switch transistor 6a of the switch controlling circuit 6 is turned ON. Thereby, the two switch diodes 4 and 5 are also turned ON. Accordingly, the intermediate frequency amplifier 3 is tightly connected to the intermediate frequency tuning circuit 2. Also, since the anode of the varactor diode VD is supplied with a voltage that is lower than the base bias voltage of the transistors 3a and 3b by 0.7 volts or more, the capacitance value of the varactor diode VD decreases. Then, the tuning frequency of the parallel tuning circuit 2a is set to be positioned between a video intermediate frequency P (58.75 MHz) and an audio intermediate frequency S (54.25 MHz), as illustrated in FIG. 2. In addition, the video intermediate frequency (+P) of the adjacent channel is attenuated by the trap circuit 2b.

Figure 3:
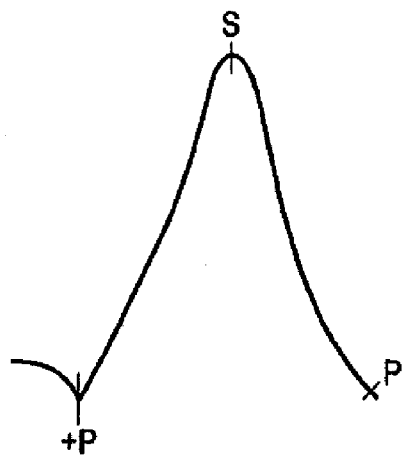
FIG. 3 is an intermediate frequency characteristic diagram when receiving an FM broadcast signal in the television tuner according to the present invention.

Further, upon receiving the FM broadcast signal, the FM broadcast signal of the selected frequency is input to the mixer 1. Simultaneously, the switch transistor 6a is turned OFF. Thereby, the two switch diodes 4 and 5 are also turned OFF. Then, the inter-terminal capacitance value of the switch diodes 4 and 5 is extremely small (generally, 1 pF or less). Therefore, the intermediate frequency amplifier 3 is loosely connected to the intermediate frequency tuning circuit 2. In addition, since the anode of the varactor diode 2e is supplied with the power supply voltage Vcc from the power supply terminal 10g via the resistors 6b and 6d, the capacitance value of the varactor diode VD becomes larger than that of the varactor diode VD when receiving the television signal, and the tuning frequency of the parallel tuning circuit 2a is set to be positioned at the audio intermediate frequency S (54.25 MHz), as illustrated in FIG. 3. However, since the intermediate frequency amplifier 3 is loosely connected, the load effect of the intermediate frequency amplifier 3 on the intermediate frequency tuning circuit 2 decreases. Therefore, the Q value of the tuning increases and thus the tuning characteristics become steep, as illustrated in FIG. 3.

Figure 4:
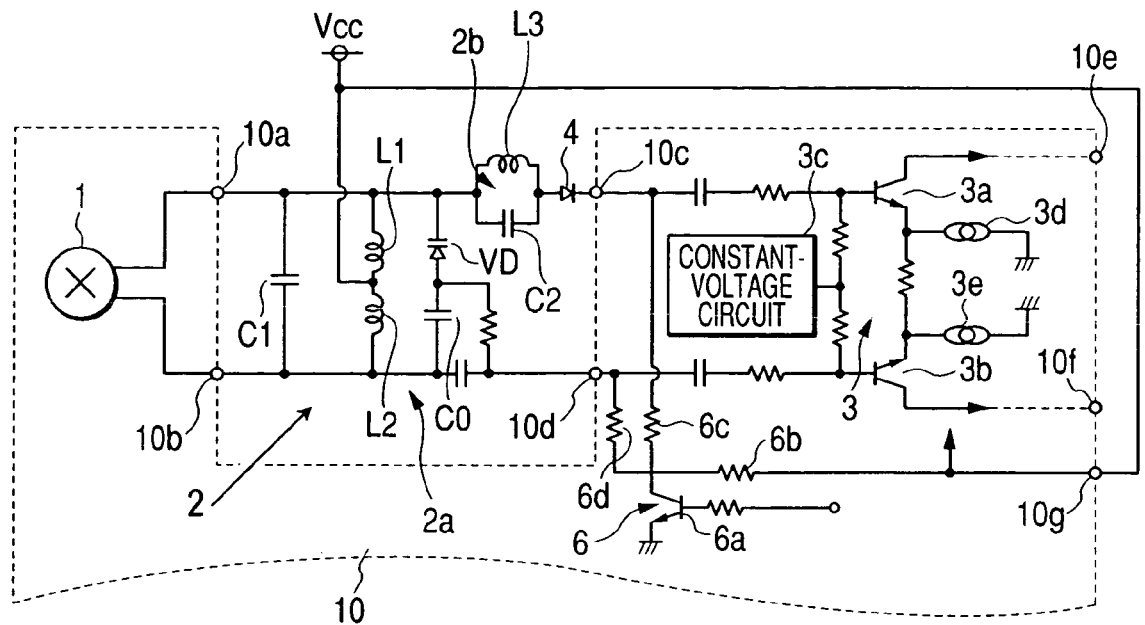
FIG. 4 is a circuit diagram illustrating another construction of the television tuner according to the present invention.
Figure 5:
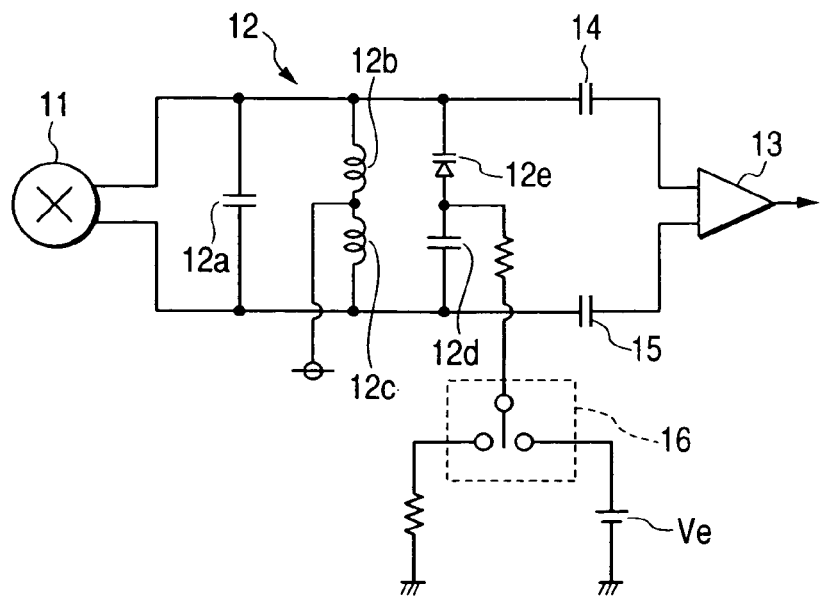
FIG. 5 is a circuit diagram illustrating the construction of a conventional television tuner.
Figure 6:
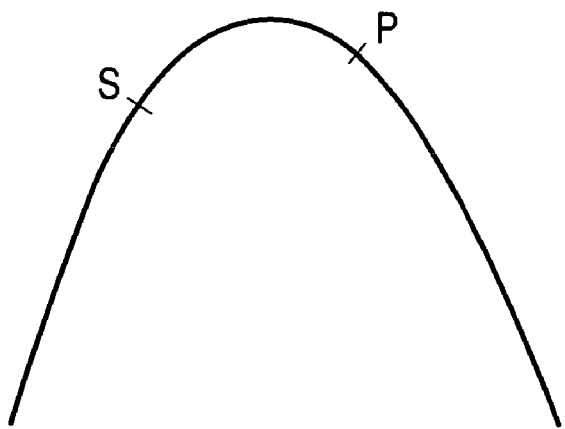
FIG. 6 is an intermediate frequency characteristic diagram when receiving a television signal in the conventional television tuner.
Figure 7:
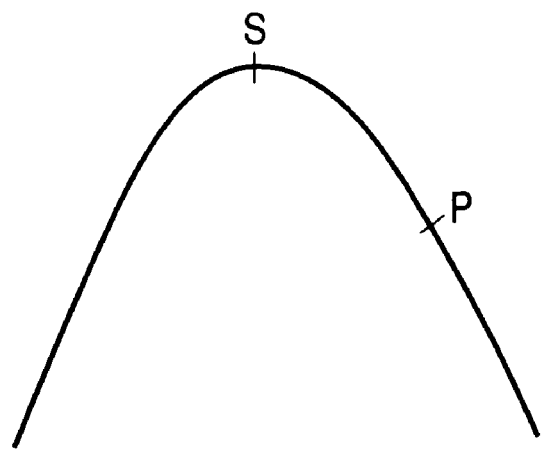
FIG. 7 is an intermediate frequency characteristic diagram when receiving an FM broadcast signal in the conventional television tuner.

In FIG. 4, only one switch diode 4 is provided at the outside of the integrated circuit 10, the anode of the switch diode 4 is supplied with the bias voltage Vcc from the intermediate frequency tuning circuit 2, and the cathode of the switch diode 4 is connected to the parallel input terminal 10c. The switch controlling circuit 6 is included in the integrated circuit 10. Also, the bases of the transistors 3a and 3b are coupled to the parallel input terminals 10c and 10d, respectively, the cathode of the switch diode 4 is connected to the parallel input terminal 10c and connected to the collector of the switch transistor 6a via the resistor 6c, and the anode of the varactor diode VD is connected to the collector of the switch transistor 6a by the resistor 6d. The remainder of the construction is similar to that in FIG. 1.

In this construction, upon receiving the television signal, the switch diode 4 is turned ON and thus the intermediate frequency amplifier 3 is tightly connected to the intermediate frequency tuning circuit 2. Also, the anode of the varactor diode VD is grounded and thus the capacitance value of the varactor diode VD becomes small. The tuning frequency of the parallel tuning circuit 2a is set to be positioned between the video intermediate frequency P (58.75 MHz) and the audio intermediate frequency S (54.25 MHz), as illustrated in FIG. 2.

In addition, upon receiving the FM broadcast signal, the switch diode 4 is turned OFF and thus the inter-terminal capacitance value becomes extremely small (generally, 1 pF or less), such that the intermediate frequency amplifier 3 is loosely connected to the intermediate frequency tuning circuit 2. Also, since the cathode of varactor diode 2e is applied with the power supply voltage and the anode thereof is also applied with the power supply voltage, the capacitance value of the varactor diode VD becomes large than that of on receiving a television signal, and the tuning frequency of the parallel tuning circuit 2a is set to be positioned at the audio intermediate frequency S (54.25 MHz), as illustrated in FIG. 3. However, since the intermediate frequency amplifier 3 is loosely connected, the load effect of the intermediate frequency amplifier 3 on the intermediate frequency circuit 2 becomes small. Therefore, the Q value of the tuning increases and the tuning characteristics become steep, as illustrated in FIG. 3.

What is claimed is:

1. A television tuner, comprising:
    a mixer to which a television signal or an FM broadcast signal is input and that outputs an intermediate frequency signal based on the television signal or an intermediate frequency signal based on the FM broadcast signal;
    an intermediate frequency tuning circuit for tuning to the intermediate frequency signals; and
    an intermediate frequency amplifier for amplifying the intermediate frequency signal output form the intermediate frequency tuning circuit;
    wherein the intermediate frequency tuning circuit and the intermediate frequency amplifier are connected to each other via at least one switch diode, and the switch diode is turned ON upon receiving the television signal, and turned OFF upon receiving the FM broadcast signal; and
    wherein a switch controlling circuit for turning the switch diode ON/OFF is provided, and the intermediate frequency amplifier and the switch controlling circuit are included in an integrated circuit.

2. The television tuner according to claim 1, wherein the switch diode is included in the integrated circuit, an anode of the switch diode and the intermediate frequency amplifier are applied with a common bias voltage, and a cathode of the switch diode is connected to the switch controlling circuit.

3. The television tuner according to claim 1, wherein the switch diode is provided at the outside of the integrated circuit, the mixer and an anode of the switch diode are supplied with a common bias voltage, and a cathode of the switch diode is connected to the switch controlling circuit.

4. The television tuner according to claim 3, wherein the intermediate frequency tuning circuit has an inductance element constituting a parallel tuning circuit and a varactor diode connected in parallel to the inductance element, a cathode of the varactor diode is applied with the common bias voltage, and a cathode of the switch diode and an anode of the varactor diode are connected to the switch controlling circuit.

* * * * *